INVENTOR.
WILLIAM B. SILVERMAN
BY Rule & Hoge,
ATTORNEYS

INVENTOR.
WILLIAM B. SILVERMAN
BY
ATTORNEYS

United States Patent Office 3,109,045
Patented Oct. 29, 1963

3,109,045
ELECTRICALLY HEATED GLASS MELTING UNIT
William B. Silverman, Toledo, Ohio, assignor to Owens-Illinois Glass Company, a corporation of Ohio
Filed Mar. 3, 1958, Ser. No. 718,567
3 Claims. (Cl. 13—6)

My invention relates to a method and apparatus for melting and refining glass and provides a new type of glass melting unit in which electrical heating is employed for melting and refining the glass batch. The invention provides a melting chamber or container consisting of electrically conducting material and immersed in a bath of molten glass which is utilized to protect the material forming said chamber from atmospheric attack. The molten glass bath also serves as a structural support for the melting chamber. The protecting glass bath is contained in a refractory tank of sufficient size to reduce materially the heat losses, and which can be built of relatively inexpensive refractories.

The primary object of the invention is to provide an apparatus useful and particularly adapted for continuously melting high temperature glasses, such as high-silica glasses and low expansion boro-silicate type glasses. The apparatus may be used for melting and refining those types of glasses where it is desirable to reduce to a minimum any sort of contamination and in particular contamination from refractory oxides.

A further object of the invention is to provide a method and apparatus for making glass in which the glass batch is not brought into contact with refractory materials while at a high temperature.

A further object of the invention is to provide a novel method and means for introducing certain types of gases into the batch materials during the melting process for accomplishing certain specific purposes as hereinafter pointed out. For example, it is well known that such gases as helium diffuse rapidly from fused silica. By the use of the helium gas for sweeping out of constituents such as carbon dioxide, oxygen and nitrogen from the melting batch by means of a continuous flow of the helium gas, there results a molten glass that is thereby made transparent, which is very desirable for certain uses of fused quartz.

In the case of melting other types of glasses in a melting chamber having walls formed of elements such as tungsten or molybdenum the practical elimination of oxygen in the glass batch is desirable to prevent corrosion of such elements. Hence, a further object of the invention is to reduce the amount of air carried by the batch into the melting compartment.

A further object of the invention is to provide for the retention of $B_2O_3$ during the melting and refining processes in the manufacture of boro-silicate glasses. With the usual apparatus employed in making such glasses the $B_2O_3$, which is costly, is partially lost by a volatilization in the checker works of conventional furnaces. In accordance with the present invention, the $B_2O_3$, when evaporated from the molten bath, is carried into the comparatively cool section of the feeder where it condenses and is returned to the melting chamber for reuse. Such system provides a homogeneous, substantially cord-free glass particularly in view of the fact that the melting batch is never in contact with refractories and it never presents a molten surface in contact with a freely circulating atmosphere, whether it be a reducing or oxidizing atmosphere. Thus there can be no loss of $B_2O_3$ or lead oxide due to atmospheric contact.

A further object of the invention is to provide a method and apparatus for producing optical glass of the highest quality, such object being attained by the use of the type of furnace herein disclosed in which the melting batch is not brought, while at a high temperature, in connection with any refractory.

A further object of the invention is to provide a glass melting and refining unit adapted for producing low melting glasses such as are used for soldering purposes and as a base of applied color lettering enamels, which glasses must be held to close composition or their characteristics are adversely altered, particularly by alumina. The present invention provides a type of melting and refining unit in which changes in composition, due to volatilization of certain elements, particularly lead, are avoided.

A further object of the invention is to provide a glass melting and refining unit which is simple in construction and which eliminates the usual furnace checker works, thereby greatly reducing the cost of construction as compared with ordinary refractory type furnaces used for like purposes.

Other objects of the invention will appear more fully hereinafter.

Referring to the accompanying drawings which illustrate a preferred form of apparatus for use in practicing my invention:

Figure 1:
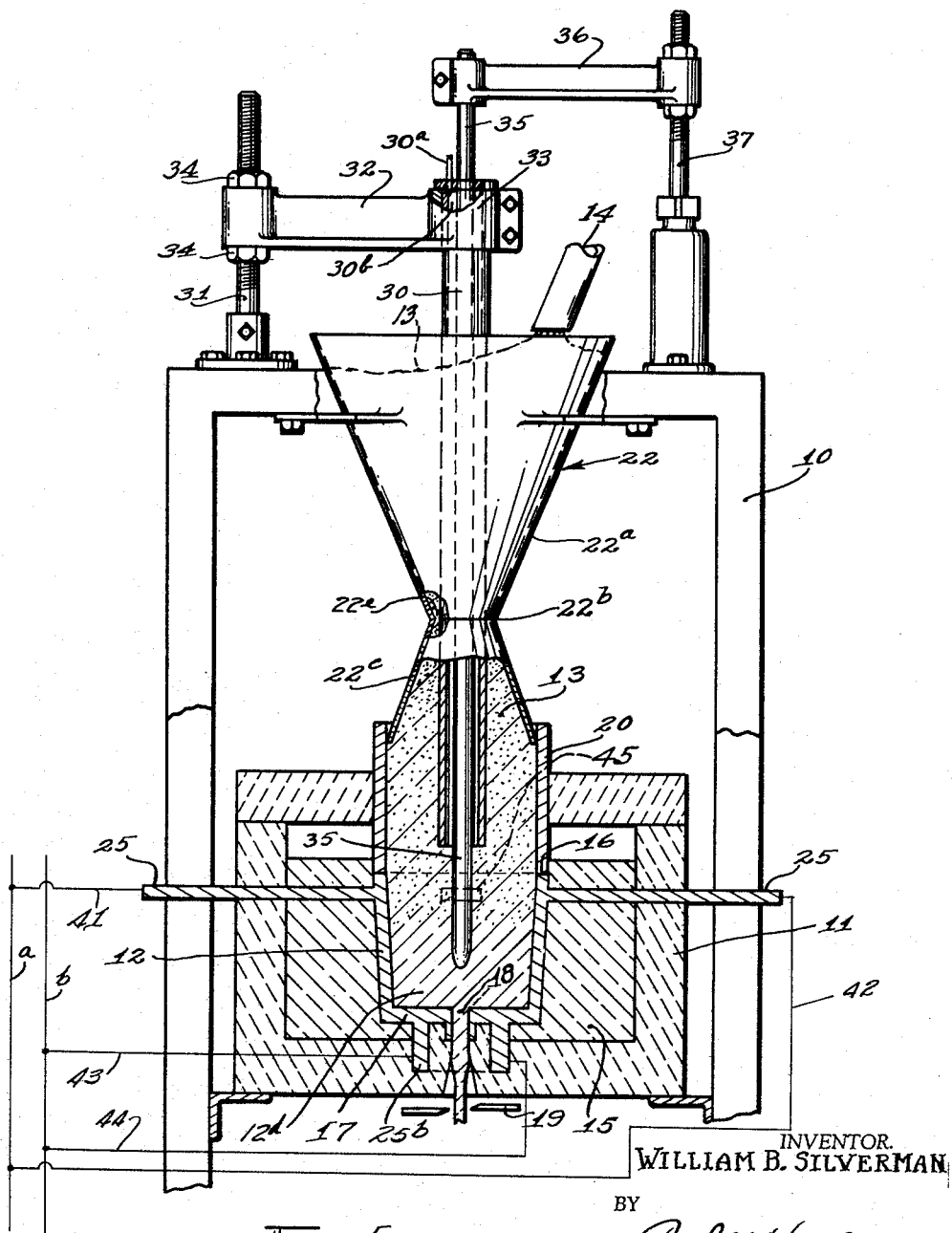
FIG. 1 is a part sectional elevation, with parts broken away, of the melting and refining unit, the section being taken at the line 1—1 on FIG. 2.

Referring to the drawings:

The glass melting and refining apparatus is mounted in a framework 10. A tank 11, made of refractory material, is supported in the frame 10. A melting element 12, in the form of a pot or receptacle, made of electrically conducting material, provides a melting chamber in which batch materials 13 is melted and refined. This melting pot is immersed in a bath of molten glass 15 within the tank 11, the upper edge 16 of the melting pot being below the level of the glass 15. The melting pot, as shown, is substantially cylindrical and formed with a bottom 17 with an outlet opening 18. The molten glass is discharged through the outlet opening 18 which is extended through the floor of the tank 11. Shears 19 may be used for severing the issuing glass to form gobs or mold charges. The glass may also be used in other forms, as for example, rods, tubing, glass fibers, or the like.

The electrically conducting melting pot 12, used as an electrical resistance for melting the glass batch, may be made of any metal which is suitable for the specific purpose for which the apparatus is being used. For example, tungsten or molybdenum would preferably be used for melting silica or quartz. Tungsten, molybdenum, or platinum may be used to melt boro-silicate glasses of low expansion characteristics. Platinum or purified iron may be used in melting glasses of the soda lime type. Metallic elements of iron, Inconel, or other fairly resistant alloys may be used to melt phosphate glasses at a low temperature. Platinum or iron based alloys may under certain circumstances be used in melting a lead-containing glass.

Mounted over the melting unit 12 is a cylindrical unit 20 which forms a batch conducting conduit or chamber through which the mixed batch materials 13 in powdered, granulated or pulverized form are conducted by gravity into the melting chamber 12. The member 20 seats on the rim or top surface 16 of the melting unit and provides a seal by which entrance of the molten glass 15 into the melting chamber 12 is prevented. The member 20 which may be made of a refractory material provides a preheating chamber in which the batch materials passing therethrough are heated to a high temperature but essentially retain their granular or pulverized form until they enter the melting pot 12.

The raw batch materials may be fed either by successive batches or continuously from a mixer through pipe 14, thence through a feeder 22 to the chamber 20. In any event the feeder 22 is maintained full of batch materials during operation of the melter. This hour-glass shaped feeder comprises an upper section 22ª in the form of a funnel with a restricted neck 22ᵇ and a lower frustoconical section 22ᶜ having its walls downwardly flared and extending from the neck 22ᵇ into the chamber 20. The lower end of the section 22ᶜ fits closely within the walls of the chamber 20 forming a seal by which the escape of batch materials or gases is prevented.

Figure 3:
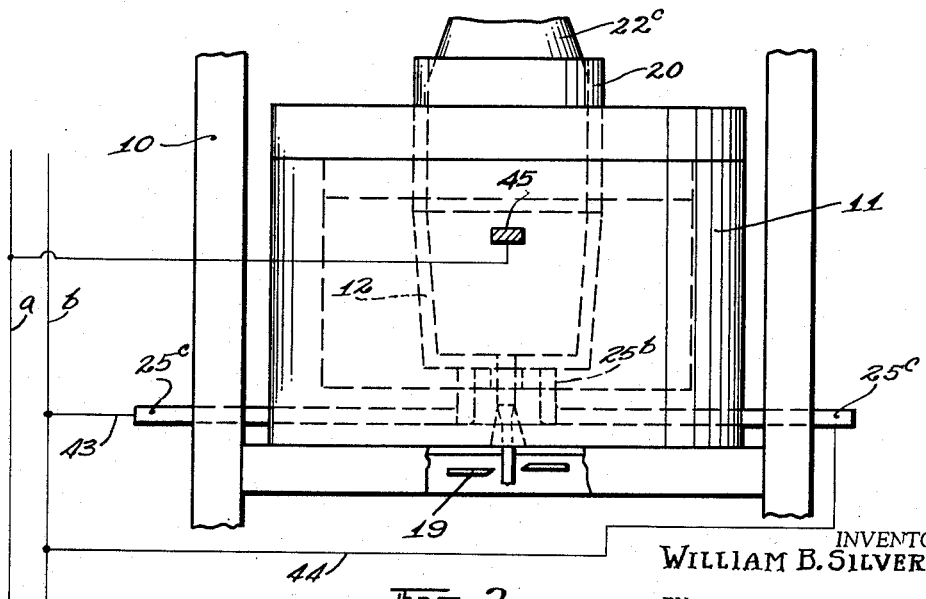
FIG. 3 is an elevational view of the apparatus, with parts broken away.

Electric current for melting the glass batch is supplied from the mains $a$ and $b$ through circuits including electrodes 25. These electrodes as shown are in the form of bars formed integral with the melting pot 12, near the rim, and extending from opposite sides thereof. These electrodes are connected through leads 41 and 42 to the main $a$. The circuits extend from the electrode 25 through the body of the melting pot to electrode 25ᵇ integral with and extending downwardly from the bottom 17 of the melting pot. Electrodes 25ᵇ are connected through leads 43 and 44 to the main $b$. In the form shown in FIG. 3, the electrodes 25ᵇ include horizontal extensions 25ᶜ.

The member 20 serves as a preheating chamber within which the raw batch materials are preheated before they enter the higher temperature within the melting pot 12 in which the materials are melted and refined. The heat rising from the melting pot 12 and the molten glass 12ᵈ therein serves for effecting such preheating of the materials in the chamber 20 before they are reduced to the molten state within the melting pot 12.

Figure 2:
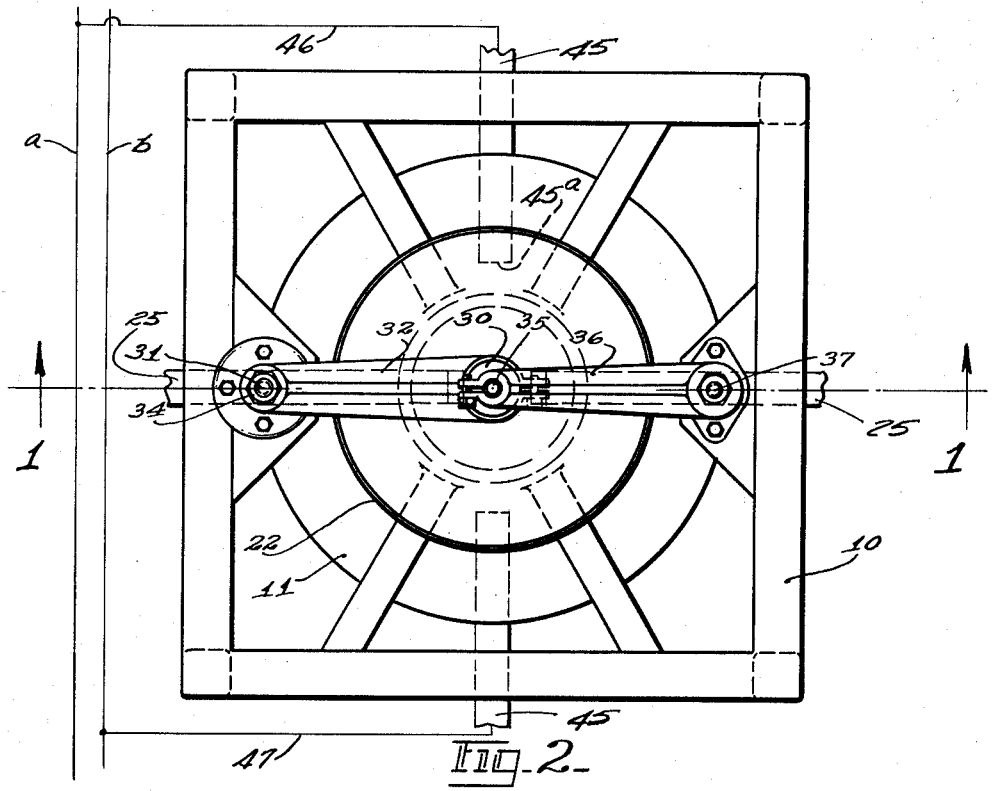
FIG. 2 is a plan view of the same.

The body of glass 15 in which the melting chamber is immersed is maintained in a molten condition by heat supplied in part from the melting pot 12 and in part by heat supplied directly from the mains $a$ and $b$ through circuits including electrodes 45. As shown in FIG. 2 these electrodes extend horizontally at right angles to the electrodes 25 with their inner ends 45ª within the tank 11 and spaced from the pot 12. The electrodes 45 are connected through leads 46 and 47 to the mains $a$ and $b$ respectively.

Mounted centrally within the feeder 22 is a vertical pipe 30 which extends downwardly within the preheating chamber 20 and upwardly through the top of the feeder. The pipe serves to feed gases at a controlled rate into the batch materials during the heating and melting processes, such as hydrogen, helium or argon, etc., which gases may in turn sweep out atmospheric gases such as oxygen and nitrogen from the batch. These discharged gases are carried upwardly around the outside of pipe 30 and filter upwardly through the descending batch and are thereby discharged. These gases, as they move through the batch, sweep out the constituent gases introduced with the batch such as oxygen, nitrogen, carbon dioxide and water, or any gases inherent to said materials under such melting conditions. Their discharge through the batch may be augmented by the use of gases such as helium etc. A constant flow of the helium gas or other desirable gas under pressure is provided to pipe 30 through pipe 30ª into chamber 30ᵇ and serves to sweep out the detrimental gaseous constituents such as carbon dioxide, oxygen, and nitrogen from the preheated mass, discharging them through the restricted opening at 22ᵉ. This results in glass which, in the case of fused silica, becomes transparent, which is very desirable for certain uses of fused silica or quartz. The elimination of oxygen or other gases from the glass batch in the manner above described is also desirable in the case of melting other types of glasses, since the amount of air carried down by the batch may contain sufficient oxygen to corrode such heating elements as tungsten and molybdenum when the heater 12 comprises such elements.

The tube 30 is mounted by means of a vertical post 31 bolted to the frame 10 and a horizontal arm 32. One end of the arm 32 is formed with a split collar 33 by which the arm is clamped to the tube 30. The arm 32 is adjustable up and down on the threaded post 31 and clamped in adjusted position by clamping nuts 34. This construction permits the tube 30 to be adjusted vertically.

Extending lengthwise through the tube 30, concentric therewith, is a vertical rod or needle 35. This rod may be movable up and down periodically for controlling the flow of glass in a manner similar to that employed in glass feeders commonly used for supplying gobs or mold charges. The rod 35 if desired, may have a stationary mounting, and also is adjustable up and down. For this purpose the rod 35 is clamped to one end of a horizontal bar 36 adjustable vertically on a post 37 mounted on the frame 10.

The rod 35 is of somewhat smaller diameter than the inner diameter of the tube 30, thereby providing an annular passageway through the pipe 30, through which the gases which replace the oxygen and other gases introduced by the batch materials, may be fed to assist the melting and refining processes. It will be observed that the lower end of the pipe 30 is positioned within the preheating chamber 20 and thus at a point where the batch materials may be still unmelted or possibly in the form of a porous mass. This permits the passage of the gases from the pipe 30, into the batch material from which it diffuses upwardly therethrough sweeping before it the undesirable gaseous constituents such as oxygen, carbon dioxide, water, etc.

A restricted neck 22ᵇ is provided at some point above the lower open end of the tube 30 and the inside diameter thereof is of only slightly greater diameter than the exterior diameter of the pipe 30. This provides a restricted annular passageway for the descending glass batch materials and provides a means whereby the gases passing upwardly through the batch may be brought into direct physical contact with major portions of the granular materials passing through this restricted area. In addition this restriction permits the building up of a greater pressure within the section 22ᶜ and prevents the further infiltration or penetration of atmospheric gases.

It will be seen that the construction as shown and described provides a substantially closed compartment or chamber comprising the melting pot 12, conduit or chamber 20 and section 22ᶜ of the feeder. As the intermediate section 20 of this closed compartment has sealing contact with the melting chamber 12 and also with the lower end of the section 22ᶜ, the only outlets from such compartment are the bottom opening 18, and the restricted passageway in the neck 22ᵇ. The molten glass forms a seal for the bottom outlet and the batch materials substantially seal the restricted neck 22ᵇ so that the only possible free outlet for gases is through the passageway 22ᵉ because pipe 30 is under controlled pressure. Thus the gases contained in the batch material and those generated during the heating and melting process can only escape through the passage 22ᵉ. In this manner, the molten glass which is at a high temperature is substantially protected from contact with any contaminating gases.

When the apparatus is being used for making a borosilicate glass the $B_2O_3$ contained in the batch is carried downward into the melting tank 12 and a portion thereof may be volatilized and carried upwardly in the form of a gas into the preheating compartment, but condenses before it reaches the tube 30 so that it is again carried downward into the melting tank for reuse. In this manner loss of the $B_2O_3$ is prevented.

The present invention can be used for making glasses generally but is more specifically adaptable for melting glasses requiring specialized protection and handling. The following examples are given of various types of glasses which may be made with the disclosed apparatus.

An example of a boro-silicate glass composition is as follows:

*Example I*

| | |
|---|---|
| NaO | 4.2 |
| $Al_2O_3$ | 2.2 |
| $B_2O_3$ | 13.0 |
| $SiO_2$ | 80.6 |

An example of a soda-lime glass composition is as follows:

*Example II*

| | |
|---|---|
| $SiO_2$ | 71.7 |
| $Al_2O_3$ | 3.0 |
| $R_2O$ | 13.0 |
| RO | 12.0 |
| $SO_3$ | 0.3 |

The $R_2O$ group in the above Example II encompasses the monovalent alkali materials, such as, for example, $Na_2O$, $K_2O$ and $Li_2O$. The RO group includes the dibasic oxides as, for example, CaO, MgO and BaO.

A glass composition with a high lead content, particularly adapted for use as a sealing glass is as follows:

*Example III*

| | |
|---|---|
| $SiO_2$ | 56.7 |
| $R_2O_3$ | 1.4 |
| $Na_2O$ | 4.2 |
| $K_2O$ | 8.0 |
| PbO | 29.5 |
| MgO | .1 |
| CaO | .1 |

In the above Example III the $R_2O_3$ group comprises the trivalent oxides of the composition, such as, for example, $Fe_2O_3$, $B_2O_3$ and $Al_2O_3$.

A glass composition with a high $Cr_2O_3$ content is as follows:

*Example IV*

| | |
|---|---|
| $SiO_2$ | 60.0 |
| $Na_2O$ | 20.0 |
| $Cr_2O_3$ | 1.0 |
| CaO | 19.0 |

The protective glass 15 in which the melting tank 12 is immersed consists preferably of a high silica glass having the following formula $SiO_2$ 90%, CaO 5%, $Na_2O$ 5%, when fused silica or boro-silicate glasses are being melted in chamber 12. The protective glass must be of a composition permitting, when molten, electrical conduction in the temperature range at which the working glass in chamber 12 is being melted. Thus for a high lead glass the protective glass would have a high alkali content to provide for conduction in the temperature range of 1800–2100° F. Glass of the formula above is especially adapted for the purpose, first, because of its relatively high electrical resistance so that it does not short circuit the metal container 12 and, secondly, because of its great stability, being substantially free from chemical and physical changes while at a high temperature and in a molten state.

Figure 4:
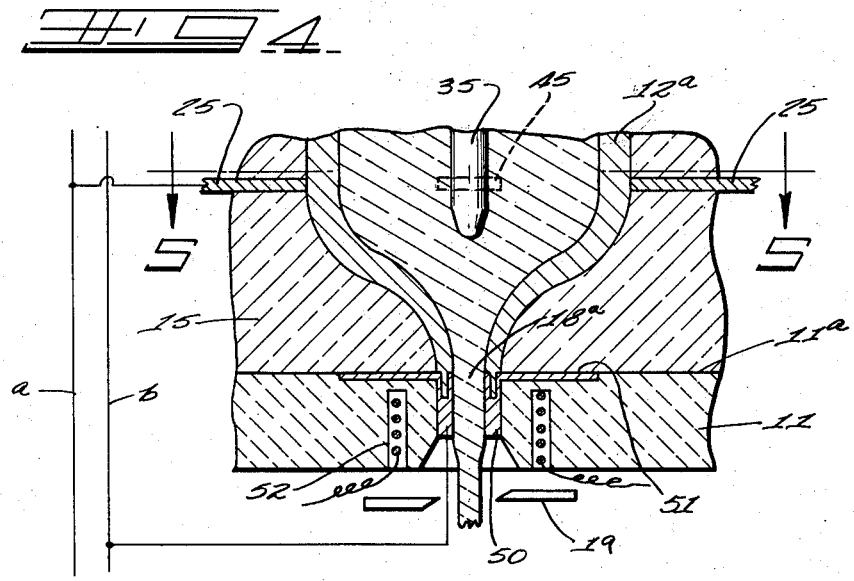
FIG. 4 is a sectional elevation of a modified form of melting unit, with parts broken away.
Figure 5:
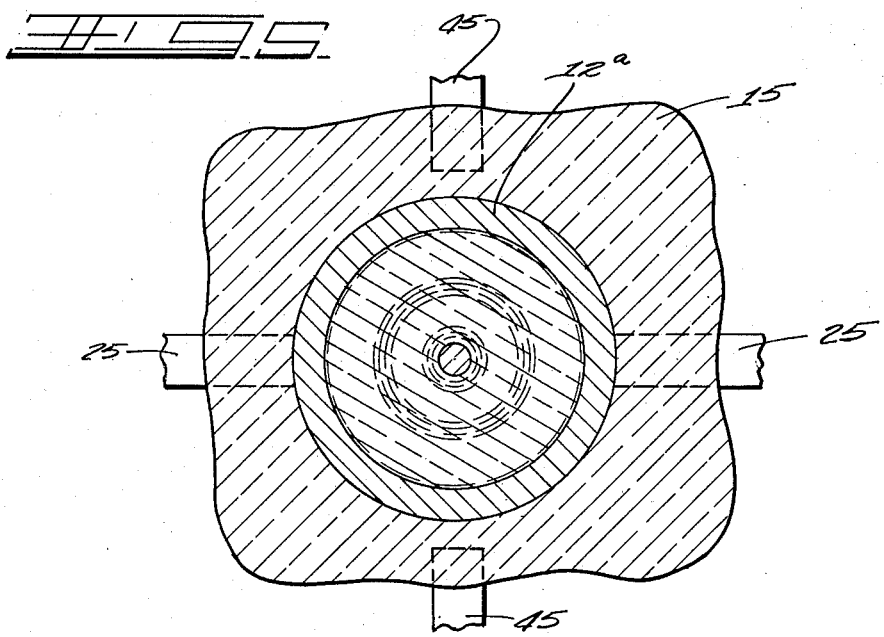
FIG. 5 is a section at the line 5—5 on FIG. 4.

FIGS. 4 and 5 illustrate a modified construction. As here shown, the lower portion of the melting tank 12ª has its side walls downwardly convergent in the form of a compound curve terminating at the lower end of the tank in a restricted circular spout with outlet opening 18ª. The tank is circular in cross section throughout its length. The inner and the outer wall surfaces of this lower portion of the tank are also convergent so that the wall thickness is gradually reduced progressively downward. The tank 12ª is electrically heated substantially as above described in connection with the tank 12. The shape of the lower portion of the tank 12ª with its tapered convergent walls is designed to give a desirable temperature gradient, with the highest temperature at the lower end of the tank. This construction further serves to bring all of the molten glass into close proximity to the high temperature walls as the glass approaches the discharge outlet.

The tank 12ª is preferably made of molybdenum. In order to protect this metal from exposure to the atmosphere while at high temperatures which would produce oxidation, the following construction is provided. The lower end portion of the tank is substantially at the level 11ª of the floor of the refractory tank 11. This floor is formed with an opening in which is mounted a cylindrical bushing 50 concentric with and forming an extension of the lower end or spout of the tank 12ª. This bushing consists of either rhodium or a platinum-rhodium alloy. The platinum is used to control the volatility. A satisfactory alloy comprises 80% platinum and 20% rhodium. The bushing may be formed with an integral ring or flange portion 51 surrounding the bushing and seated on the floor 11. The ring 51 is countersunk with its upper surface flush with that of the floor 11. The bushing with its ring guard 51 can be either press-fitted, screwed, or welded to the molybdenum body 12ª to form an air-tight seal, thus fully protecting the tank 12ª from contact with the air. Means for regulating the temperature of the bushing 50 and maintaining it at the desired high temperature comprises a heating element 52 surrounding the outlet and imbedded in the refractory floor 11. This heating element comprises an electricaly heated platinum coil.

The glass compositions melted in the above-described apparatus and under the conditions set forth herein may be fed to a working point for any desired end use.

Modifications may be resorted to within the spirit and scope of my invention as defined in the appended claims.

I claim:

1. Glass melting apparatus comprising a tank for containing molten glass, the walls of which consist of refractory material, means for heating the glass in said tank to maintain it in a molten state, a melting chamber within said tank having a discharge opening in the bottom thereof, the walls of said chamber consisting of electrically conducting material and being spaced from the walls of said tank, a preheating chamber mounted over said melting chamber with its lower portion within said molten glass containing tank, said preheating chamber forming a continuation thereof and providing a gravity flow channel through which glass batch materials are fed downward into the melting chamber, means for supplying electric current to the walls of said melting chamber thereby heating said walls and melting the glass batch materials as they are fed thereto, a batch feeder mounted over said preheating chamber, said feeder comprising a relatively large open topped chamber having downwardly and inwardly tapered side walls joined to a second chamber having downwarly and outwardly tapered side walls, a conduit extending downwardly through said feeder into said preheating chamber and forming a passageway for the introduction of gases into said preheating chamber, said conduit and batch feeder, at the junction of the two chambers, forming a restricted passageway through which the batch materials flow counter to the flow of gas out of the preheating chamber, the combined melting, preheating and feeder chambers forming a substantially closed compartment except for the opening provided between said conduit and batch feeder.

2. Glass melting apparatus comprising a metallic melting chamber having a discharge opening in the bottom thereof, a preheat chamber positioned above and forming a vertical extension of said melting chamber, batch material feeding means positioned above said preheat chamber and communicating therewith, said melting chamber, preheat chamber and batch feeding means being sealingly engaged to form a closed, vertical flow path, means for applying heat to said melting chamber and thereby melting batch material fed thereto, and a pipe extending downwardly through said feeding means and into said preheating chamber, said pipe providing a passageway through which gases are introduced into said preheating chamber.

3. Glass melting apparatus comprising a melting chamber, a preheating chamber positioned over said melting chamber, means for feeding batch material downwardly into said preheating chamber, the walls of said melting chamber being comprised of electrically conducting material, means for supplying electric current to said melting chamber walls thereby generating heat by current flow that is sufficient to melt the batch material, a tank surrounding said melting chamber and spaced therefrom, said tank containing molten heat insulating and protective material in surrounding relationship to said melting chamber, heating means for maintaining said insulating material in its molten condition, the lower portion of said preheating chamber being immersed in said molten material and the upper portion thereof extending above said tank and a pipe extending downwardly through said feeding means and into said preheating chamber, said pipe providing a passageway through which gases are introduced into said preheating chamber, the combined melting chamber and preheating chamber forming a substantially closed and sealed compartment except for an annular opening provided between said pipe and the walls of said feeding means.

References Cited in the file of this patent

UNITED STATES PATENTS

| | | |
|---|---|---|
| 706,283 | Voelker | Aug. 5, 1902 |
| 1,217,340 | Pease | Feb. 27, 1917 |
| 1,438,936 | Eimer | Dec. 12, 1922 |
| 1,603,221 | Thompson | Oct. 12, 1926 |
| 1,954,732 | Gossler | Apr. 10, 1934 |
| 2,038,627 | Badger | Apr. 28, 1936 |
| 2,097,378 | McIntyre et al. | Oct. 26, 1937 |
| 2,097,379 | McIntyre et al. | Oct. 26, 1937 |
| 2,212,528 | Slayter | Aug. 27, 1940 |
| 2,225,667 | Staelin | Dec. 24, 1940 |
| 2,331,052 | Shadduck | Oct. 5, 1943 |
| 2,386,685 | Hood | Oct. 9, 1945 |
| 2,398,952 | Nachod | Apr. 23, 1946 |
| 2,834,157 | Bowes | May 13, 1958 |
| 2,958,161 | Palmer | Nov. 1, 1960 |

FOREIGN PATENTS

| | | |
|---|---|---|
| 128,588 | Australia | Aug. 2, 1948 |